(12) United States Patent
Clymans

(10) Patent No.: US 10,308,729 B2
(45) Date of Patent: Jun. 4, 2019

(54) REACTOR SYSTEMS AND PROCESSES RELATED THERETO

(71) Applicant: ExxonMobil Chemical Patents Inc., Baytown, TX (US)

(72) Inventor: Paul J. Clymans, Kapelle-Op-Den-Bos (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/566,179

(22) PCT Filed: Apr. 5, 2016

(86) PCT No.: PCT/US2016/026005
§ 371 (c)(1),
(2) Date: Oct. 12, 2017

(87) PCT Pub. No.: WO2016/182645
PCT Pub. Date: Nov. 17, 2016

(65) Prior Publication Data
US 2018/0094083 A1 Apr. 5, 2018

Related U.S. Application Data

(60) Provisional application No. 62/158,654, filed on May 8, 2015.

(30) Foreign Application Priority Data

Jul. 1, 2016 (EP) ..................................... 15174800

(51) Int. Cl.
*C08F 2/01* (2006.01)
*C08J 11/02* (2006.01)
*C08F 2/34* (2006.01)
*B01J 19/24* (2006.01)
(Continued)

(52) U.S. Cl.
CPC .............. *C08F 2/01* (2013.01); *B01D 5/0039* (2013.01); *B01J 19/24* (2013.01); *C08F 2/34* (2013.01); *C08F 10/02* (2013.01); *C08J 11/02* (2013.01); *B01J 2219/00006* (2013.01); *B01J 2219/00031* (2013.01)

(58) Field of Classification Search
CPC .... C08F 2/01; C08F 10/02; C08F 2/34; C08F 2/38; C08J 11/02; B01J 19/24; B01J 2219/00031; B01J 2219/0006; B01D 5/0039
USPC .......................................................... 526/64
See application file for complete search history.

(56) References Cited

U.S. PATENT DOCUMENTS 2,862,872 A 12/1958 Beckberger et al.
6,596,241 B2 7/2003 Donck
7,411,026 B2 8/2008 Ohlsson et al.
(Continued)

FOREIGN PATENT DOCUMENTS

EP 2589612 A 5/2013
EP 2746304 A 6/2014
(Continued)

*Primary Examiner* — William K Cheung

(57) ABSTRACT

A process for separating components of a reactor off gas is provided. A related reactor system is also provided. The reactor system may include a high pressure tubular reactor and/or an autoclave reactor and may be used for the production polyolefin polymers.

23 Claims, 5 Drawing Sheets

(51) Int. Cl.
*C08F 10/02* (2006.01)
*B01D 5/00* (2006.01)

(56) References Cited

U.S. PATENT DOCUMENTS

| | | |
|---|---|---|
| 8,466,240 B2 | 6/2013 | Solis et al. |
| 2015/0011717 A1 | 1/2015 | Garland, Jr. et al. |

FOREIGN PATENT DOCUMENTS

| | | |
|---|---|---|
| EP | 2746305 A | 6/2014 |
| WO | 2007/018871 A | 2/2007 |
| WO | 2012/082674 A | 6/2012 |
| WO | WO 2012/082674 A1 * | 6/2012 |

\* cited by examiner

REACTOR SYSTEMS AND PROCESSES RELATED THERETO

PRIORITY CLAIM

This application is a National Phase Application of International Application Serial No. PCT/US2016/026005, filed Apr. 5, 2016, and claims the benefit of Ser. No. 62/158,654, filed May 8, 2015, and European Application No. 15174800.1, filed Jul. 1, 2015, the disclosures of which are fully incorporated by reference in their entireties.

FIELD OF THE INVENTION

The invention relates to a process for separating components of a reactor off gas. The invention also relates to a reactor system including tubular reactors and/or autoclave reactors for the production of polyolefin polymers.

BACKGROUND OF THE INVENTION

High pressure tubular reactors have become established over the past 80 years as a means of producing low and medium density polyethylene polymers. Such tubular reactors are large scale installations and typically operate at a pressure in excess of 2000 bar and sometimes as high as 3100 bar.

Typically, a high pressure process employing a tubular reactor includes compressing ethylene in a primary compressor and then mixing that ethylene with recycled ethylene and further compressing the ethylene, optionally mixed with modifiers or chain transfer agents and/or comonomers, such as vinyl acetate, in a secondary compressor, heating at least a portion of the compressed ethylene and introducing that heated ethylene into the front end of a tubular reactor, introducing an initiator into the tubular reactor in at least three separate locations, thereby defining at least three reaction zones, allowing the ethylene to polymerize, and cooling the reaction mixture in at least the first two reaction zones, maintaining a pressure drop over the length of the tubular reactor, releasing the reaction mixture through a high-pressure, let-down valve, cooling the reaction mixture and separating the reaction mixture in a product separator into polymer and unreacted ethylene, and recycling unreacted ethylene.

The product separation may be carried out in a single stage. However, two stage separation is generally preferred. In the first stage, known as the high pressure separator, the first separation of polymer from unreacted ethylene is carried out. The separated gas is fed to the high pressure recycle system for return to the secondary compressor. The molten polymer in the bottom of the high pressure separator is decompressed into a second stage, known as a low pressure separator, and almost all of the remaining ethylene, and comonomer and modifier if present, is separated from the polymer and is usually sent to the purge gas or low pressure separator off gas compression system. See, WO 2007/018871 and WO 2012/082674; U.S. Patent Application Publication No. 2015/0011717; U.S. Pat. Nos. 6,596,241; 7,411,026; and 8,466,240; and EP 2 589 612 A, EP 2 746 304 A, EP 2 746 305 A, and EP 2 862 872 A.

For example, FIG. 1 is a schematic of a polymerization plant 1 including an ethylene feed line 2 which supplies fresh ethylene to a primary compressor 3. The ethylene discharged from the primary compressor 3 flows via conduit 4 having a valve 4a to the secondary compressor 5. Also entering the secondary compressor 5 is a stream of fresh modifier(s) and/or optional comonomer(s) and a stream of recycled ethylene. The fresh modifier stream is supplied by a separate modifier pump 6. The recycled ethylene comes from the high pressure recycle system 7.

The secondary compressor 5 is described in more detail below. The secondary compressor 5 discharges compressed ethylene in, for example, five streams 8a, 8b, 8c, 8d, and 8e. Stream 8a may account for 20% of the total ethylene flow. Stream 8a is heated by a steam jacket (not shown) which heats the ethylene, prior to entry into the front end of the tubular reactor 9. The four remaining ethylene side streams 8b, 8c, 8d, and 8e may each enter the reactor as sidestreams. Sidestreams 8b, 8c, 8d, and 8e are cooled. The tubular reactor 9 is also shown with six initiator inlets 10a to 10f which are spaced at intervals along reactor 9 and are fed from an initiator mixing and pumping station 11. The first initiator injection point 10a is just downstream of the front end of the reactor 9 and defines the start of the first reaction zone. Initiator entering through that first initiator inlet 10a combines with the hot ethylene from stream 8a and polymerization begins, raising the temperature of the ethylene as it travels down tubular reactor 9. A heating/cooling jacket (not shown) fitted on reactor 9 cools the reaction mixture and the temperature of the reaction mixture peaks at between, for example, 210 and 350° C., as initiator is consumed and the rate of polymerization begins to fall, and then begins to decline. Entry of the first sidestream 8b cools the reaction mixture further. The second initiator injection inlet 10b is just downstream of the entry point of sidestream 8b and defines the start of the second reaction zone. Once again, the temperature of the reaction mixture rises, peaks and falls as it flows along the tubular reactor 9 with the entry of the second sidestream 8c providing a further rapid cooling prior to entry of initiator at the third initiator inlet 10c, which defines the start of the third reaction zone. The third, fourth, fifth and sixth reaction zones are similar to the second reaction zone except that the sidestreams are optional with regard to the fifth and sixth reaction zones, and therefore the distance between the fifth and sixth initiator inlets 10e and 10f may be relatively long, in order to allow for a greater length of heating/cooling jacket.

Downstream of the sixth initiator inlet 10f and the sixth reaction zone, the tubular reactor terminates in a high-pressure, let-down valve 12.

In the region upstream of the injection point of the first sidestream 8b, the tubular reactor 9 has an initial internal diameter, which may increase downstream of sidestream 8b, and increases further downstream of each subsequent sidestream until a maximum internal diameter of, for example, at least 65 mm, and preferably at least 70 mm is reached in the region downstream of the final sidestream 8e. That internal diameter profile allows the flow rate throughout the tubular reactor 9 to be maintained at about 15 m/s during normal operation under a secondary compressor throughput of 160 tonnes/hour and at an acceptable pressure drop across the reactor.

The high-pressure, let-down valve 12 controls the pressure in the tubular reactor 9. Immediately downstream of the high-pressure, let-down valve 12 is product cooler 13. Upon entry to the product cooler 13, the reaction mixture is in a phase separated state. It exits into high pressure separator 14. The overhead gas from the high pressure separator 14 flows into the high pressure recycle system 7 where the unreacted ethylene is cooled and returned to the secondary compressor 5. The polymer product flows from the bottom of the high pressure separator 14 into the low pressure separator 15, separating almost all of the remaining ethylene, optionally, comonomers and/or modifiers, if present, sometimes collectively called the "off gas" from the polymer. That remaining ethylene and optional components are typically transferred either to a flare or purge system (not shown). The molten polymer flows from the bottom of the low pressure separator 15 to an extruder (not shown) for extrusion, cooling and pelletizing via line 15a.

Purging or flaring the off gas from the low pressure separator results in a loss of valuable monomers and modifiers, especially, considering the number of and large scale of high pressure polyethylene installations around the world. Accordingly, there remains a need to capture value by recycling components, mainly, monomers and modifiers, of the low pressure separator off gas, as opposed to merely purging or flaring them from the system.

SUMMARY OF THE INVENTION

In a class of embodiments, the invention provides for a process for separating components of a reactor off gas comprising:

1) passing a reactor off gas from a polymerization process through one or more product separators to produce gas phase (a) and a liquid phase (b);

2) cooling the gas phase (a) to produce a cooled gas phase (a) and passing the cooled gas phase (a) to produce a first gas phase and a first liquid phase;

3) compressing the first gas phase to produce a compressed first gas phase and cooling the compressed first gas phase to produce a cooled first gas phase and passing the cooled first gas phase to a second gas/liquid separator to produce a second gas phase and a second liquid phase;

4) compressing the second gas phase to produce a compressed second gas phase and cooling the compressed second gas phase to produce a cooled second gas phase and passing the cooled second gas phase to a third gas/liquid separator to produce a third gas phase and a third liquid phase;

5) compressing the third gas phase to produce a compressed third gas phase and cooling the compressed third gas phase to produce a cooled third gas phase and passing the cooled third gas phase to a fourth gas/liquid separator to produce a fourth gas phase and a fourth liquid phase; and 6) optionally, recycling the fourth gas phase to the polymerization process.

The liquid phase (b) may be directed to a recovery stage.

In a class of embodiments, the fourth liquid phase may be recycled to the third gas/liquid separator; the third liquid phase may be recycled to the second gas/liquid separator; and the second liquid phase may be recycled to the first gas/liquid separator.

In the previous embodiment, the first liquid phase may be recycled to the polymerization process, directed to a recovery stage, a purification stage, a storage unit, or any combination thereof.

In another class of embodiments, the fourth liquid phase may be recycled to the third gas/liquid separator; the third liquid phase may be recycled to the polymerization process and/or directed to a recovery stage; the second liquid phase may be recycled to the first gas/liquid separator; and the first liquid phase may be directed to a recovery stage, a purification stage, a storage unit, or any combination thereof.

In yet another class of embodiments, the fourth liquid phase may be recycled to the third gas/liquid separator; the third liquid phase may be recycled to the second gas/liquid separator, and the second liquid phase may be recycled to the polymerization process, directed to a recovery stage, a purification stage, storage unit, or any combination thereof. The first liquid phase may be directed to a storage unit or fuel system.

In a final class of embodiments, the invention also provides for a reaction system comprising:

1) one or more compressors in fluid connection with 2) one or more reactors in fluid connection with 3) one or more product separators in fluid connection with 4) a plurality of gas/liquid separators fluidly connected in series, wherein at least one of the product separators comprises an off gas, and the off gas is in fluid connection with at least one of the gas/liquid separators and wherein the plurality of gas/liquid separators are represented by $N_i$, $N_x$, $N_y$, and $N_f$, and where:

$N_i$ is the initial gas/liquid separator;

$N_x$ is one or more first middle gas/liquid separators, wherein x is a number from 1-97;

$N_y$ is one or more second middle gas/liquid separators, wherein y=t−(x+2); and $N_f$ is the final gas/liquid separator;

t is the total number of separators in the series and is a number from 4-100.

Other embodiments of the invention are described and claimed herein and are apparent by the following disclosure.

DETAILED DESCRIPTION OF THE INVENTION

Figure 1:
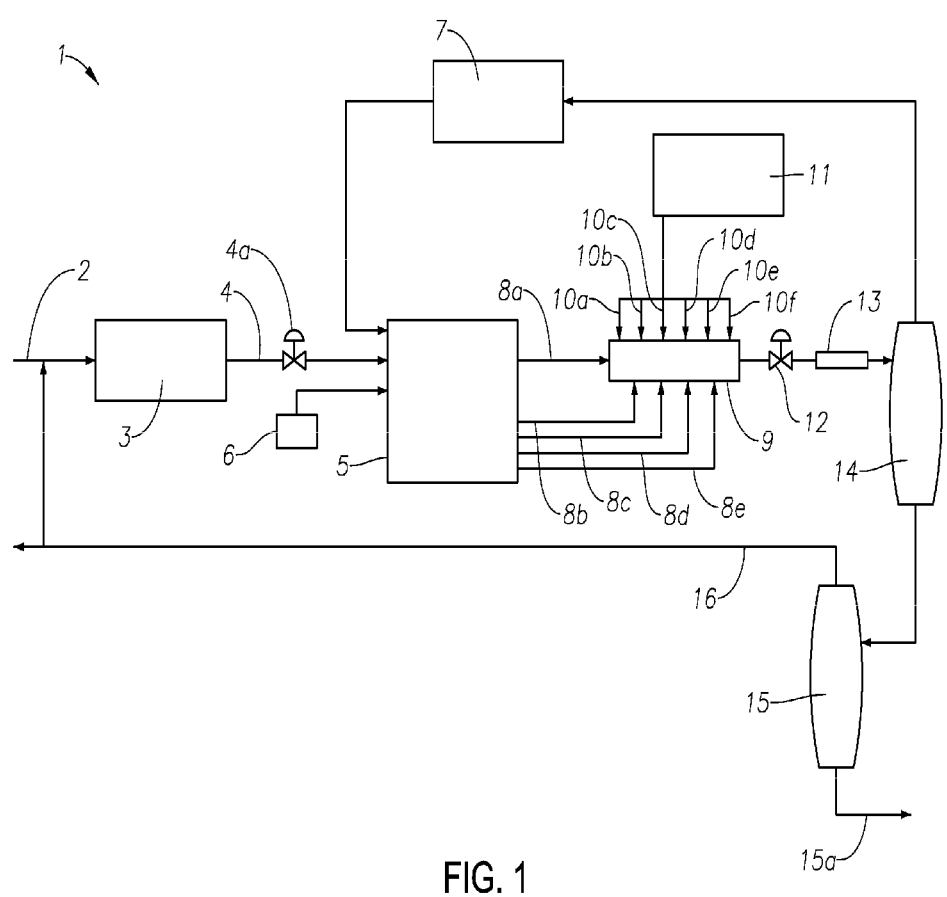
FIG. 1 is a schematic of an exemplary high pressure, tubular reactor system.

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Classes of embodiments of the invention are directed to the processes for the separation of components of the gas phase of a product separator sometimes referred to in industry as the "off gas" of the product separator or "off gas" a low pressure product separator if more than one separator is employed. As used herein, "off gas" shall refer to at least one gaseous stream or line, optionally, containing components that may be liquids and/or solids, exiting from the outlet of one or more product separators. Product separators are generally employed in high pressure polyethylene tubular reactor systems to decompress the product and other materials exiting the reactor after polymerization and to isolate and concentrate the polymer from reactants, by-products, and raw materials. Tubular reactors, autoclave reactors, or a combination of one or more these reactors may be utilized. These reactors are well-known and many of these reactors and reactor systems have been described in, for example, WO 2007/018871; U.S. Patent Application Publication Nos. 2010/0317804 and 2015/0011717; U.S. Pat. Nos. 6,596,241; 7,411,026; 8,048,971, and 8,466,240; and EP 2 746 305 A. These reactors generally operate at high pressures and produce many useful polyethylene polymers. For example, a typical process for the manufacture of ethylene polymers and copolymers may comprise the steps of: compressing ethylene in a primary compressor at a throughput of, for example, at least 55 tonnes/hour and then mixing that ethylene with recycled ethylene and further compressing the ethylene to a pressure of, for example, at least 2300 bar at a throughput of at least 120 tonnes/hour in a secondary compressor, heating at least a portion of the compressed ethylene to a temperature of, for example, at least 95° C. and introducing a portion of that heated ethylene into the front end of a tubular reactor having a maximum internal diameter of, for example, at least 65 mm and a length of at least 1500 m, introducing at least one initiator into the tubular reactor in at least two or more separate locations, thereby defining reaction zones, allowing the ethylene to polymerize, and cooling the reaction mixture in one or more of the reaction zones, maintaining a pressure drop over the length of the tubular reactor such as to maintain a flow velocity in the tubular reactor of, for example, at least 6 m/s, releasing the reaction mixture through a high-pressure, let-down valve, cooling the reaction mixture and separating the reaction mixture in a product separator into polymer and unreacted ethylene, and recycling unreacted ethylene. Such high pressure processes typically rely heavily on their compressors and generally include a primary and secondary compressor.

The function of the primary compressor is to pressurize fresh ethylene (make-up ethylene) to the pressure of the ethylene recycle system, for feed to the secondary compressor. The primary compressor may be a single compressor, that alone pressurizes the ethylene to the pressure of the recycle stream, or it may be two or more compressors in series or in parallel that, in combination, pressurize the fresh ethylene to the pressure of the ethylene recycle system. In some existing ethylene tubular reactor plants, the ethylene discharged from the primary compressor is divided into two streams, one stream being combined with recycled ethylene and fed to the suction of the secondary compressor, and the other stream being injected into the ethylene/polymer mixture downstream of the high-pressure, let-down valve, thereby providing rapid cooling of the ethylene/polymer mixture prior to entry into the product separation unit. In some embodiments, substantially the entire output of the primary compressor is fed to the secondary compressor.

Make-up ethylene is typically supplied to tubular reactor facilities at pressures from about 15 to 90 bar. As well as fresh make-up ethylene, the primary compressor may also receive ethylene recycled from the low pressure end of the product separator unit and from the primary and secondary compressor leakage systems.

It is also possible to direct a small fraction of one of the ethylene recycle streams to a purge stream to limit build-up of inert components in the reactor system. In principle, the proportion of the total reactor gas throughput which is sent to the purge stream is typically in the range of from below 1 to 15%.

The discharge pressure of the primary compressor is matched to the pressure of the high pressure ethylene recycle system and may be, for example, in the range of from 270 bar to 350 bar, and is preferably in the range of from 280 bar to 320 bar. Also, the ethylene is preferably cooled after exit from the primary compressor and prior to entry into the secondary compressor. However, the precise design of the primary compressor is not critical.

The secondary compressor compresses the ethylene to a pressure of at least 2300 bar for supply to the tubular reactor. As discussed with regard to the primary compressor, the secondary compressor is preferably a unit driven by a single motor, but may alternatively comprise two or more compressors in series or in parallel driven by separate motors. Any configuration of compressors, including the configuration described in greater detail below, is intended to be within the scope of this disclosure as long as said configuration is adapted to compress the ethylene from the intermediate pressure (of the ethylene as it leaves the primary compressor) to the desired reactor pressure, typically in the range of 2300 to 3000 bar. The secondary compressor is mechanically complex and is subject to very high mechanical forces, but is nonetheless required to operate at a high throughput reliably and safely over a lifetime which may be several decades. Accordingly, the successful design and operation of the secondary compressor is critical to the viability of the process and is one of the key aspects of the invention. However, the mechanical demands on the secondary compressor, particularly the loads applied through the drive train, increase as the required throughput increases.

Secondary compressors for use with tubular polymerization reactors are typically two-stage reciprocating compressors having, say, six or eight cylinders arranged in a compressor frame and having a common crankshaft driven by an electric motor standing at one end of the compressor frame. For more details regarding secondary compressors, see, for example, WO 2007/018871.

Upon leaving the secondary compressor, at least a portion of the ethylene passes to the front end of the tubular reactor.

In a preferred embodiment, the ethylene discharged from the secondary compressor is divided into more than one stream, one of which enters the front end of the tubular reactor and the other or others enter as sidestreams at points along the length of the tubular reactor. In a particularly preferred embodiment, the ethylene discharged from the secondary compressor is split into 4, 5, 6, or 7 streams, with one stream going to the front end of the tubular reactor and the others entering as sidestreams. The streams may be of unequal volume, thereby providing flexibility in tailoring of the volume of ethylene entering each reaction zone in the tubular reactor.

The ethylene which is introduced into the front end of the tubular reactor is heated to at least 95° C., preferably at least 135° C., or in some cases at least 160° C. in order to promote the decomposition of the initiator and start the polymerization reaction. The initiator is injected at least three different points along the length of the tubular reactor, thereby defining at least three reaction zones.

Polymerization commences immediately downstream of the first reaction zone thereby causing the temperature of the reaction mixture to rise due to the exothermic nature of the polymerization. As the temperature rises, initiator decomposition and polymerization increase in rate, accelerating the heat generation and causing the temperature to rise further.

As initiator is consumed, initiation and polymerization slow and, at the point where heat generation equals heat conducted away from the reaction mixture, the temperature peaks and then begins to fall.

Thus, as the reaction mixture travels along the length of the reactor, the temperature of the reaction mixture increases to a peak and then decreases until the next initiator injection point is reached, whereupon the process begins again. The zones downstream of initiator injection points in which the polymerization reaction occurs are known to the skilled person as reaction zones. The tubular reactor will generally be equipped with at least one temperature regulated heating/cooling jacket in each reaction zone.

In the embodiment in which the ethylene discharge from the secondary compressor is split into two or more streams, with one stream entering the front end of the reactor and the other stream(s) entering as sidestream(s), the sidestream(s) typically enter(s) the reactor upstream of an initiator injection point, preferably after being cooled, for example, to between 10° C. and 20° C., before entry into the reactor in order to reduce the temperature of the reaction mixture. As mentioned above, the total conversion of monomer to polymer along the length of the reactor is, in practice, limited by the ability to cool the reaction mixture, and so cooling the sidestreams can allow an increase in conversion for a given reactor.

The peak temperature for each reaction zone will advantageously be in the range of from 200° C. to 350° C. Preferably, in at least one reaction zone the peak temperature will be in the 280° C. to 340° C. range, preferably from 290° C. to 315° C. The increase in temperature in a reaction zone is proportional to the amount of polymer made in that reactor zone and so operating at high peak temperatures favours high conversion. However, the kinetics of ethylene polymerization are such that as the temperature rises, chain transfer to polymer increases relative to propagation of linear chains and the polydispersity index increases, resulting in an increase in the haze value of the polymer produced. Accordingly, when it is desired to manufacture a low haze grade of polymer, it will be necessary to operate at lower peak temperatures. Preferably, in each reaction zone upstream of an initiator injection point (i.e., in all but the last reaction zone) the reaction mixture is cooled to at least 20° C., more preferably to at least 40° C., and most preferably to at least 50° C., below the peak temperature of that reaction zone before the reaction mixture reaches the next initiator injection point.

The cooling in any reaction zone may be by means of a cooling jacket or a combination of a cooling jacket and introduction of a sidestream of cooled ethylene.

In the process of polymerizing ethylene in a tubular reactor, once the desired throughput of ethylene through the secondary compressor and into the reactor is established, the pressure in the reactor is controlled by the high-pressure, let-down valve, through which the product mixture exits the reactor. Opening the valve decreases pressure in the tubular reactor; closing the valve increases the pressure. Moreover, a pressure drop exists along the length of the tubular reactor which forces the reaction mixture along the reactor at a desired velocity (the term "reactor pressure" herein refers to the maximum pressure in the reactor, that is, the pressure immediately downstream of the secondary compressor, unless another meaning is obvious from the context). The velocity of the reaction mixture through the reactor is believed to be of critical importance to the effectiveness of the heat transfer out of the reactor. It is theorized that at low velocity laminar flow and build-up of thicker layers of polymer on the inside of the reactor tubes inhibits heat transfer away from the reaction mixture.

However, the pressure drop over the length of the reactor is limited by the requirement that the pressure must not fall below the point at which phase separation for the reaction mixture occurs. The pressure drop for a given throughput can be reduced by increasing the internal diameter of the tubular reactor. However, increased tube diameter also makes effective cooling of the reactor mixture more difficult.

Typically, the maximum internal diameter of the tubular reactor is at least 65 mm in order to keep the pressure drop over the length of the reactor to an acceptable level. In the embodiment in which a portion of the ethylene discharged from the secondary compressor enters the tubular reactor as sidestreams, it will be desirable for the reactor to have regions of differing internal diameter increasing in stages down the length of the reactor as sidestreams enter.

The particular maximum internal diameter of a tubular reactor chosen will be dependent upon the throughput of the secondary compressor, on the output pressure from the secondary compressor and on the length of the tubular reactor employed, all of which relate to the pressure drop experienced over the length of the reactor. Typically, the tubular reactor has a length in the 1500 m to 5000 m range.

The polymerization in the tubular reactor is carried out in at least three reaction zones, each reaction zone commencing at an initiator injection point. In each reaction zone, ethylene is converted to polymer and, therefore, having a larger number of reaction zones will generally increase conversion. However, each reaction zone will typically necessitate increasing the length of the tubular reactor and, therefore, will increase the pressure drop across the reactor. Preferably, the initiator is injected at 4, 5, or 6 different points along the tubular reactor thereby giving rise to 4, 5, or 6 reaction zones.

The pressure drop over the length of the tubular reactor should be maintained at a level such as to maintain a flow velocity of the reaction mixture in the tubular reactor of at least 6 m/s. It has been found that the flow velocity influences the efficiency of cooling the reaction mixture by heat transfer through the reactor tube walls, and that the heat transfer is particularly poor at low flow velocities. The actual minimum flow velocity which is desirable depends on the temperature of the cooling jacket. Where the cooling jacket contains fluid at a temperature below 50° C., and particularly below 30° C., such as water which is maintained at low temperature by cooling means such as a cooling tower, then the flow velocity will preferably be at least 14 m/s in order to inhibit formation of a solid polymer layer on the inside of the tubular reactor which itself further inhibits heat transfer (even then, it may be necessary to allow the temperature of the cooling jacket in a particular reaction zone to rise periodically, in order to disperse any polymer layer which has formed). Accordingly, the flow velocity may be in excess of 14 m/s and is advantageously significantly higher, for example, in the range of from 14 to 20 m/s.

The proportion of the total ethylene which enters the tubular reactor, whether in the front end stream or as a sidestream, which is converted to polymer before exiting the reactor is referred to as the conversion. The conversion achieved is in part related to the pressure at which the reactor operates, with a higher front end pressure both increasing the rate of polymerization and making possible a greater pressure drop over the length of the reactor. However, operating at higher pressures imposes more strain upon the secondary compressor and also increases the energy consumption with a consequent cost disadvantage.

The reactor pressure is controlled by operation of a high-pressure, let-down valve which is located at the downstream end of the tubular reactor. Whilst the flow exiting from the reactor could be divided into more than one stream with each stream passing through a respective high-pressure, let-down valve, in practice, it is preferred for there to be only one such valve, and for the entire output of the reactor to pass through it.

From the product cooler the product mixture will typically flow directly into the first stage of the product separator unit.

The product separation of the processes of the invention may be carried out in a single stage. However, two stage separation is generally preferred. In the first stage, known as the high pressure separator, the first separation of polymer from unreacted ethylene is carried out. The separated gas is fed to the high pressure recycle system for return to the secondary compressor. The molten polymer in the bottom of the high pressure separator is decompressed into a second stage, known as a low pressure separator. In the low pressure separator, a gas phase, sometimes referred to as an "off gas," and liquid phase or polymer-rich phase is separated.

The polymer-rich phase from the low pressure separator will typically be fed to one or more hot melt extruders, for combination with additives, extruding and pelletizing.

The off gas 16 as shown in FIG. 1 will be processed in accordance with the following classes of embodiments of the invention.

Figure 2:
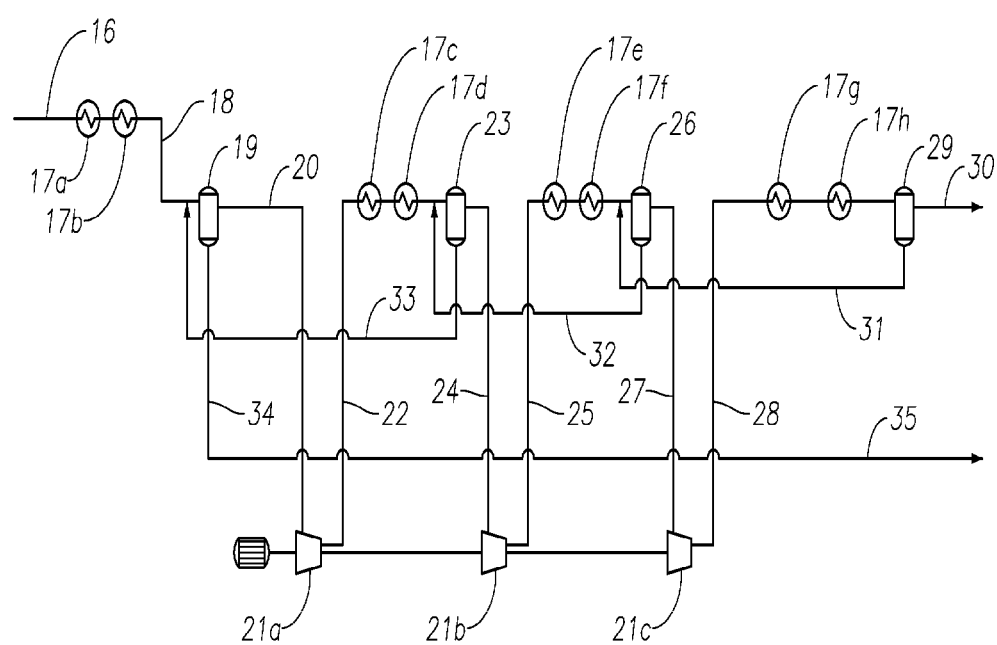
FIG. 2 is a schematic of a class of embodiments of the invention directed to the separation of components of an off gas from a product separator.

In a class of embodiments of the invention and in accordance with FIG. 2, the off gas 16 is cooled with one or more heat exchangers or coolers 17a 17b (the two terms may be used interchangeably unless otherwise specified; typically, the cooler may be cooled water or chilled water coolers) to produce a cooled gas phase (a) 18. The cooled gas phase (a) is then passed to a first gas/liquid separator 19 to produce a first gas phase and a first liquid phase.

The first gas phase 20 is then compressed in at least one cylinder of a compressor 21a to produce a compressed first gas phase and passing the compressed first gas phase 22 to one or more heat exchangers 17c 17d to produce a cooled first gas phase and passing the cooled first gas phase to a second gas/liquid separator 23 to produce a second gas phase and a second liquid phase.

The second gas phase 24 is then compressed in at least one cylinder of a compressor 21b to produce a compressed second gas phase and passing the compressed second gas phase 25 to one or more heat exchangers 17e 17f to produce a cooled second gas phase and passing the cooled second gas phase to a third gas/liquid separator 26 to produce a third gas phase and a third liquid phase.

The third gas phase 27 is then compressed in at least one cylinder of a compressor 21c to produce a compressed third gas phase and passing the compressed third gas phase 28 to one or more heat exchangers 17g 17h to produce a cooled third gas phase and passing the cooled third gas phase to a fourth gas/liquid separator 29 to produce a fourth gas phase and a fourth liquid phase (the aforementioned process 16-29 shall be referred to as the "cascading recycle process").

The cascading recycle process may further comprise one or more additional steps of compressing the gas phase of any one of the previous steps in at least one cylinder of a compressor to produce a compressed additional gas phase and passing the compressed additional gas phase to one or more heat exchangers to produce a cooled additional gas phase and passing the cooled additional gas phase to at least one additional gas/liquid separator to produce an added gas phase and an added liquid phase. The process may be repeated as many times as necessary. The added gas phase(s) may then be directed to any one of the compression and cooling steps in the cascading recycle process.

The added liquid phase(s) may be directed to a line or location of at least one of the first liquid phase, the second liquid phase, the third liquid phase, and the fourth liquid phase, or, line, inlet, or location of at least one of the first gas/liquid separator, the second gas/liquid separator, the third gas/liquid separator, and the fourth gas/liquid separator.

Continuing with reference to FIG. 2, the fourth gas phase 30 may then be recycled to the polymerization process or zone with or without treatment or purification. Numbers 16-30 referenced above correspond to FIGS. 2-5.

The fourth liquid phase 31 may then be recycled to the third gas/liquid separator 26; the third liquid phase 32 may then be recycled to the second gas/liquid separator 23; and the second liquid phase 33 may then recycled to the first gas/liquid separator 19.

The first liquid phase 34 may then be recycled to the polymerization process or zone, directed to a recovery stage, a purification stage, a storage unit, or any combination thereof via line 35. Preferably, the first liquid phase is recycled to the polymerization process or zone.

As used herein, "recycled to the polymerization process," "zone", or "reactor" refers to returning one or more reactants to the polymerization process utilizing a reactor without undergoing substantial separation or purification steps. However, "recycle(d)" used in other contexts, unless otherwise stated, may broadly refer to merely returning a material or a portion of that material to a process step already performed in a multi-step process.

In contrast, certain streams or lines ("streams" and "lines" may be used interchangeably unless otherwise stated) may be sent to a recovery stage. As used herein, "a recovery stage" shall refer to a stage comprising any treatment of that stream before returning the material in that stream or a portion thereof to the polymerization process or zone.

Additionally, other streams may be sent to a purification stage where the stream would undergo one or more purification processes, e.g., distillation or a series of distillation steps, sieve filtration, etc., before returning that stream or a portion thereof of that stream to the polymerization process or zone.

Finally, a stream may always be sent to a storage unit for short-term or long-term storage, and, of course, any combination of the dispositions of a stream or line described above may be contemplated.

Figure 3:
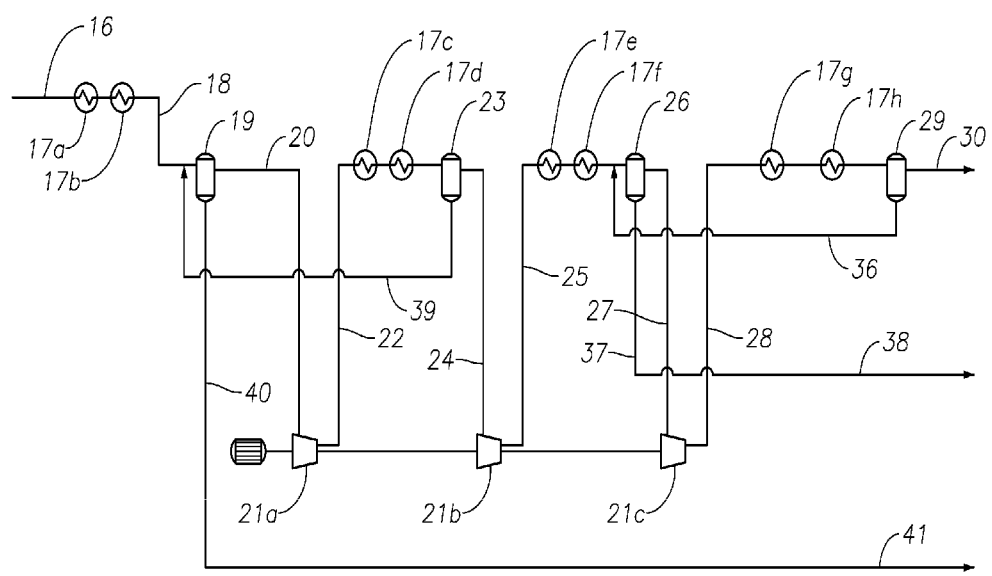
FIG. 3 is a schematic of another class of embodiments of the invention directed to the separation of components of an off gas from a product separator.

In another class of embodiments of the invention and in accordance with FIG. 3, the off gas 16 would proceed in accordance with the cascading recycle process as defined above.

However, the fourth liquid phase 36 would be recycled to the third gas/liquid separator 26; the third liquid phase 37 would then be recycled to the polymerization process or zone and/or directed to a recovery stage via line 38; the second liquid phase 39 would be recycled to the first gas/liquid separator 19; and the first liquid phase 40 would directed to a recovery stage, a purification stage, a storage unit, or any combination thereof via line 41. Preferably, the first liquid phase would be directed to a purification stage.

Figure 4:
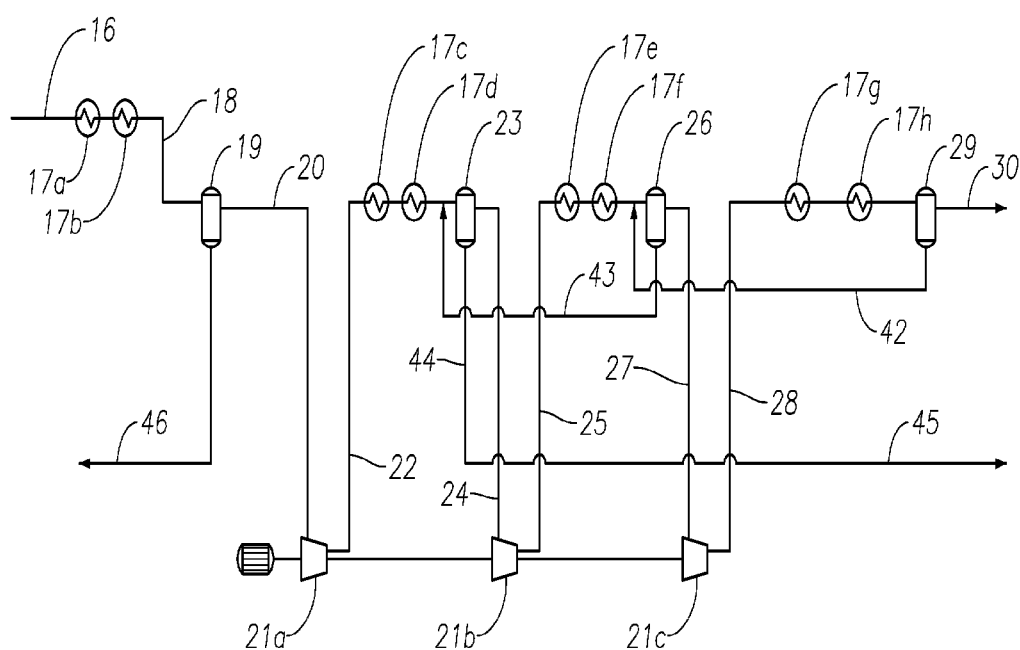
FIG. 4 is a schematic of yet another class of embodiments of the invention directed to the separation of components of an off gas from a product separator.

In yet another class of embodiments of the invention and in accordance with FIG. 4, the off gas 16 would proceed in accordance with the cascading recycle process as defined above.

However, the fourth liquid phase 42 would be recycled to the third gas/liquid separator 26, the third liquid phase 43 would then be recycled to the second gas/liquid separator 23, and the second liquid phase 44 would then be recycled to the polymerization process, directed to a recovery stage, a purification stage, storage unit, or any combination thereof via line 45.

The first liquid phase would be directed to a fuel system and/or storage unit via line 46.

Figure 5:
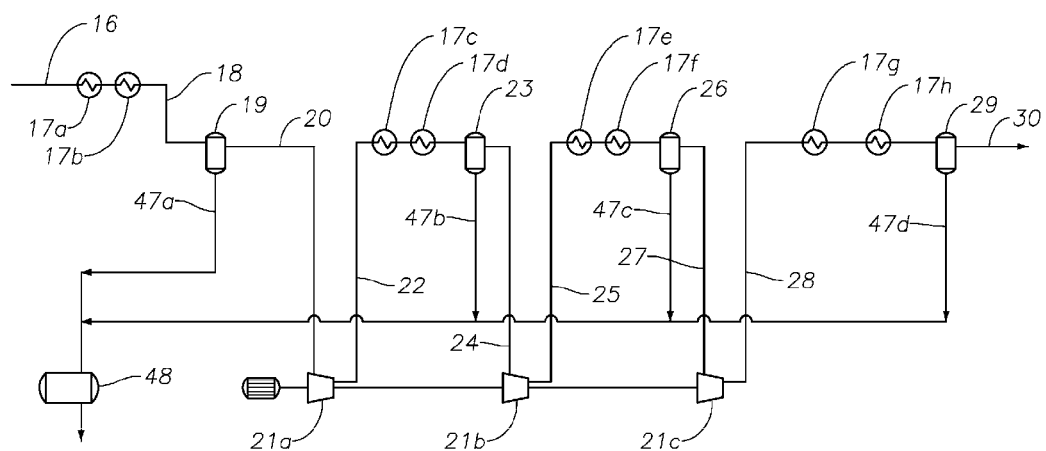
FIG. 5 is a schematic of a comparative approach for the separation of components of an off gas from a product separator.

In contrast, as a comparative approach, FIG. 5 is provided to show a less desirable outcome of the liquid phases referenced above. In accordance with FIG. 5, the off gas 16 would proceed in accordance with the cascading recycle process as defined above. In this comparative approach, the liquid phases 47a 47b 47c 47d from the gas/liquid separators 19 23 26 29 are merely directed, either directly or indirectly, to a storage unit 48. In this comparative approach, no material recovery is readily available and valuable monomers and/or modifiers cannot be recovered. Such a loss might represent millions of dollars in added operational costs for a polymer manufacturer.

It should also be appreciated that optional or auxiliary equipment (e.g., drums, pumps, valves, etc.) is contemplated with the above referenced classes of embodiments but not shown in the above referenced figures. For example, a polymer entrainment drum may be placed between the off gas 16 and the first set of heat exchangers as a safeguard should any polymer still be present in line 16. Additionally, one or more pumps may be placed by or near the outlets for the liquid phase of the gas/liquid separators to maintain the desired pressure drop of the system.

In Table 1 below, illustrations of embodiments described in the above Figures are provided to illustrate possible monomer savings or losses. They are only provided as illustrations and generated under different process conditions.

TABLE 1

|  | FIG. 2 | FIG. 3 | FIG. 4 | FIG. 5 |
|---|---|---|---|---|
| Ethylene losess (kg/h) | 1.9 | 12 | 6 | 16.7 |
| VA purity of Condensate stream 1 (wt %) | 89.6 | 11.9 | 16.7 | 50.6 |
| VA purity of Condensate stream 2 (wt %) | NA | NA | 92 | 93.2 |
| VA purity of Condensate stream 3 (wt %) | NA | 84.7 | NA | 90.7 |
| VA purity of Condensate stream 4 (wt %) | NA | NA | NA | 47.8 |
| VA purity of Condensate stream 1 (wt %) (without dissolved gas) | 90.6 | 11.9 | 16.8 | 51.1 |
| VA purity of Condensate stream 2 (wt %) (without dissolved gas) | NA | NA | 95.3 | 95.3 |
| VA purity of Condensate stream 3 (wt %) (without dissolved gas) | NA | 92.3 | NA | 98.1 |
| VA purity of Condensate stream 4 (wt %) (without dissolved gas) | NA | NA | NA | 98.1 |
| Condensate stream 1 (kg/h) | 191 | 7.9 | 11.3 | 14.7 |
| Condensate stream 2 (kg/h) | NA | NA | 184 | 57.5 |
| Condensate stream 3 (kg/h) | NA | 152.2 | NA | 52.2 |
| Condensate stream 4 (kg/h) | NA | NA | NA | 18.1 |

FIG. 2 represents the scheme with the lowest ethylene loss. The condensate may be sent to purification 35 because it also contains lube oil.

FIG. 3 represents the scheme where preferably the first condensate stream may be sent to purification 41 and the second condensate stream may be directly sent for re-use in the polymerization process 38.

FIG. 4 is the scheme that may be used for low content EVA grades, where the first condensate stream is typically sent to fuel 46 and the third condensate stream may be re-used or sent to purification 45.

FIG. 5 demonstrates a conventional scheme representing the most ethylene loss.

In another class of embodiments of the invention, the invention provides for a reaction system comprising:
1) one or more compressors in fluid connection with
2) one or more reactors in fluid connection with
3) one or more product separators in fluid connection with
4) a plurality of gas/liquid separators fluidly connected in series, wherein at least one of the product separators comprises an off gas, and the off gas is in fluid connection with at least one of the gas/liquid separators and wherein the plurality of gas/liquid separators are represented by $N_i$, $N_x$, $N_y$, and $N_f$, and where:

$N_i$ is the initial gas/liquid separator;

$N_x$ is one or more first middle gas/liquid separators, wherein x is a number from 1-97; alternatively, 1-30, alternatively, 1-15, and alternatively 1-5

$N_y$ is one or more second middle gas/liquid separators, wherein $$y=t-(x+2); \text{ and}$$

$N_f$ is the final gas/liquid separator;

t is the total number of separators in the series and is a number from 4-100, alternatively, 4-60, alternatively, 4-12, and alternatively, 4-10.

In an embodiment, the $N_f$ separator may comprise a liquid phase line directed to the $N_y$ separator, the $N_y$ separator may comprise a liquid phase line directed to the $N_x$ separator, and the $N_x$ separator may comprise a liquid phase line directed to the $N_i$ separator.

The $N_i$ separator may comprise a liquid phase line directed to a polymerization process zone.

In another embodiment, the $N_f$ separator may comprise a liquid phase line directed to the $N_y$ separator, the $N_y$ separator may comprise a liquid phase line directed to a polymerization process zone or a recovery zone, the $N_x$ separator may comprise a liquid phase line directed to the $N_i$ separator, and the $N_i$ separator may comprise a liquid phase line directed to a purification zone.

In yet another embodiment, the $N_f$ separator may comprise a liquid phase line directed to the $N_y$ separator, the $N_y$ separator may comprise a liquid phase line directed to the $N_x$ separator, and the $N_x$ separator may comprise a liquid phase line directed to a recovery zone.

The $N_i$ separator may comprise a liquid phase line directed to a storage unit or fuel system.

In any of the previous embodiments, the $N_i$, $N_x$, and $N_y$ separators may each comprise a gas phase line in fluid connection with at least one cylinder of a compressor and one or more heat exchangers and each gas phase line may be fluidly connected in series to the separators.

In any of the previous embodiments, the $N_f$ separator may comprise a gas phase line directed to a polymerization process zone.

The one or more reactors may be selected from the group consisting of tubular reactors, autoclave reactors, and combinations thereof.

All equipment and piping are in fluid communication or connection in accordance with their respective figures and/or descriptions unless otherwise stated.

Copolymerization

As well as ethylene homopolymers, the processes of the invention may be used for the manufacture of ethylene copolymers such as ethylene-vinyl acetate copolymers, or even terpolymers. Typically, the comonomer(s) will be pressurized and injected into the secondary compressor at one or more points. Other possible comonomers include propylene, 1-butene, iso-butene, 1-hexene, 1-octene, other lower alpha-olefins, methacrylic acid, methyl acrylate, acrylic acid, ethyl acrylate and n-butyl acrylate. Additionally, comonomers may also include dienes. Reference herein to "ethylene" should be understood to include ethylene and comonomer mixtures, except where another meaning is implied by context.

Modifier

The process of the invention will often involve the use of a modifier to control the molecular weight of the product polymer by promoting chain transfer. Examples of chain transfer agents include tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof. For further details about transfer agents, see, *Advances In Polymer Science*, Vol. 7, pp. 386-448, (1970).

Initiators

Initiators may be used to initiate the free radical ethylene polymerization and many suitable initiators will be known to the skilled person. Organic peroxide initiators are widely employed in industry. Typically, a blend of several initiators having different half-life temperatures will be used in order to achieve the desired reaction kinetics. The pure peroxides are mixed, typically in a hydrocarbon solvent, and are then injected into the tubular reactor at the initiator injection locations.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person skilled in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

Although the methods and systems described herein and their advantages have been described in detail, it should be understood that various changes, substitutions, and alterations could be made without departing from the spirit and scope of the inventions described herein as defined by the following claims.

What is claimed is:

1. A process for separating components of a reactor off gas comprising:
    1) passing a reactor off gas from a polymerization process through one or more product separators to produce a gas phase (a) and a liquid phase (b);
    2) cooling the gas phase (a) to produce a cooled gas phase (a) and passing the cooled gas phase (a) to a first gas/liquid separator to produce a first gas phase and a first liquid phase;
    3) compressing the first gas phase to produce a compressed first gas phase and cooling the compressed first gas phase to produce a cooled first gas phase and passing the cooled first gas phase to a second gas/liquid separator to produce a second gas phase and a second liquid phase;
    4) compressing the second gas phase to produce a compressed second gas phase and cooling the compressed second gas phase to produce a cooled second gas phase and passing the cooled second gas phase to a third gas/liquid separator to produce a third gas phase and a third liquid phase;
    5) compressing the third gas phase to produce a compressed third gas phase and cooling the compressed third gas phase to produce a cooled third gas phase and passing the cooled third gas phase to a fourth gas/liquid separator to produce a fourth gas phase and a fourth liquid phase; and
    6) directing the liquid phase (b) to a recovery stage.

2. The process of claim 1, wherein the fourth gas phase is recycled to the polymerization process.

3. The process of claim 1, wherein the fourth liquid phase is recycled to the third gas/liquid separator; the third liquid phase is recycled to the second gas/liquid separator; and the second liquid phase is recycled to the first gas/liquid separator.

4. The process of claim 3, wherein the first liquid phase is recycled to the polymerization process, directed to a recovery stage, a purification stage, a storage unit, or any combination thereof.

5. The process of claim 4, wherein the first liquid phase is recycled to the polymerization process.

6. The process of claim 1, wherein the fourth liquid phase is recycled to the third gas/liquid separator; the third liquid phase is recycled to the polymerization process and/or directed to a recovery stage; the second liquid phase is recycled to the first gas/liquid separator; and the first liquid phase is directed to a recovery stage, a purification stage, a storage unit, or any combination thereof.

7. The process of claim 6, wherein the first liquid phase is directed to a purification stage.

8. The process of claim 1, wherein the fourth liquid phase is recycled to the third gas/liquid separator, the third liquid phase is recycled to the second gas/liquid separator, and the second liquid phase is recycled to the polymerization process, directed to a recovery stage, a purification stage, storage unit, or any combination thereof.

9. The process of claim 8, wherein the first liquid phase is directed to a fuel system and/or storage unit.

10. The process of claim 1, further comprising one or more additional steps of compressing the gas phase of any one of steps 2)-5) to produce a compressed additional gas phase and cooling the compressed additional gas phase to produce a cooled additional gas phase and passing the cooled additional gas phase to at least one additional gas/liquid separator to produce an added gas phase and an added liquid phase.

11. The process of claim 10, wherein the added gas phase is directed to any one of steps 2)-5).

12. The process of claim 10, wherein the added liquid phase is directed to a line or location of at least one of the first liquid phase, the second liquid phase, the third liquid phase, and the fourth liquid phase, or, line, inlet, or location of at least one of the first gas/liquid separator, the second gas/liquid separator, the third gas/liquid separator, and the fourth gas/liquid separator.

13. A reaction system comprising:
1) one or more compressors in fluid connection with
2) one or more reactors in fluid connection with
3) one or more product separators in fluid connection with
4) a plurality of gas/liquid separators fluidly connected in series, wherein at least one of the product separators comprises an off gas, and the off gas is in fluid connection with at least one of the gas/liquid separators and wherein the plurality of gas/liquid separators are represented by $N_i$, $N_x$, $N_y$, and $N_f$, and wherein:

$N_i$ is the initial gas/liquid separator;

$N_x$ is one or more first middle gas/liquid separators, wherein x is a number from 1-97;

$N_y$ is one or more second middle gas/liquid separators, wherein $y=t-(x+2)$;

$N_f$ is the final gas/liquid separator;

t is the total number of separators in the series and is a number from 4-100; and the one or more reactors is selected from the group consisting of: tubular reactors, autoclave reactors, and a combination thereof.

14. The reaction system of claim 13, wherein x is 1-5.

15. The reaction system of claim 13 or 14, wherein t is 4-10.

16. The reaction system of claim 13, wherein the $N_f$ separator comprises a liquid phase line directed to the $N_y$ separator, the $N_y$ separator comprises a liquid phase line directed to the $N_x$ separator, and the $N_x$ separator comprises a liquid phase line directed to the $N_i$ separator.

17. The reaction system of claim 13, wherein the $N_i$ separator comprises a liquid phase line directed to a polymerization process zone.

18. The reaction system of claim 13, wherein the $N_f$ separator comprises a liquid phase line directed to the $N_y$ separator, the $N_y$ separator comprises a liquid phase line directed to a polymerization process zone or a recovery zone, the $N_x$ separator comprises a liquid phase line directed to the $N_i$ separator, and the $N_i$ separator comprise a liquid phase line directed to a purification zone.

19. The reaction system of claim 13, wherein the $N_f$ separator comprises a liquid phase line directed to the $N_y$ separator, the $N_y$ separator comprises a liquid phase line directed to the $N_x$ separator, and the $N_x$ separator comprises a liquid phase line directed to a recovery zone.

20. The reaction system of claim 19, wherein the $N_i$ separator comprises a liquid phase line and is directed to a storage unit or fuel system.

21. The reaction system of claim 13, wherein the $N_i$, $N_x$, and $N_y$ separators each comprise a gas phase line in fluid connection with at least one cylinder of a compressor and one or more heat exchangers and each gas phase line is fluidly connected in series to the separators.

22. The reaction system of claim 13, wherein the $N_f$ separator comprises a gas phase line directed to a polymerization process zone.

23. The reaction system of claim 13, wherein the one or more reactors comprises a tubular reactor.

* * * * *